United States Patent [19]

Fague

[11] Patent Number: 5,514,207
[45] Date of Patent: May 7, 1996

[54] LOW MOLECULAR WEIGHT POLYETHYLENE GLYCOLS AS LATENCY EXTENDERS IN PIGMENTED INK JET INKS

[75] Inventor: Gary R. Fague, Canandaigua, N.Y.

[73] Assignee: Xerox Corporation, Stamford, Conn.

[21] Appl. No.: 483,770

[22] Filed: Jun. 7, 1995

[51] Int. Cl.$^6$ .................................................. C09D 11/02
[52] U.S. Cl. ............................................ 106/20 R; 106/20 D
[58] Field of Search ................. 106/20 R, 23 R, 106/20 D

[56] References Cited

U.S. PATENT DOCUMENTS

| | | | |
|---|---|---|---|
| 4,585,484 | 4/1986 | Haruta et al. | 106/22 B |
| 4,627,875 | 12/1986 | Kobayashi et al. | 106/22 H |
| 4,877,451 | 10/1989 | Winnik et al. | 106/23 C |
| 5,100,469 | 3/1992 | Pontes et al. | 106/20 R |
| 5,100,471 | 3/1992 | Winnik et al. | 106/23 C |
| 5,180,425 | 1/1993 | Matrick et al. | 106/22 R |
| 5,205,861 | 4/1993 | Matrick | 106/20 D |
| 5,354,369 | 10/1994 | Shimomura et al. | 106/22 K |
| 5,356,464 | 10/1994 | Hickman et al. | 106/20 R |
| 5,389,133 | 2/1995 | Gundlach et al. | 106/22 R |

*Primary Examiner*—Helene Klemanski
*Attorney, Agent, or Firm*—Oliff & Berridge

[57] ABSTRACT

An aqueous ink jet ink composition includes a pigment and an aqueous carrier medium containing sulfolane and a low molecular weight polyethylene glycol. In preferred embodiments, the low molecular weight polyethylene glycol has a number average molecular weight between 350 and 650.

19 Claims, No Drawings

LOW MOLECULAR WEIGHT POLYETHYLENE GLYCOLS AS LATENCY EXTENDERS IN PIGMENTED INK JET INKS

BACKGROUND OF THE INVENTION

This invention relates to aqueous inks for ink jet printers, and, more particularly, to aqueous pigmented inks containing cosolvents.

Ink jet printing is a non-impact method that, in response to a digital signal, deposits droplets of ink on a substrate such as paper or transparent film. Ink jet printers, especially thermal ink jet printers, have found broad application with personal computers in the office and home.

Thermal ink jet printers use a battery of nozzles, each containing a resistor element, to fire ink droplets toward the print media. Nozzle openings are typically about 40 to 60 micrometers in diameter. Thermal ink jet printers require inks that do not plug these small openings.

Therefore, a critical requirement for an ink jet ink is the ability to remain in the fluid condition in a nozzle opening on exposure to air, the so-called "decap" conditions. This ability allows a nozzle to function over a period of non-use or during operation of infrequently utilized nozzles.

Pluggage can be caused by evaporation of organic solvent or water from the surface of the nozzle. In pigment-based inks this evaporation can cause precipitation of the dispersion, flocculation of the pigment dispersion, and precipitation of solid additives.

Initial evaporation generally causes an increase in viscosity that affects the ability of the nozzle to fire a drop of ink since ink jet nozzles are designed to operate within specific viscosity ranges. The inception of pluggage may cause distortion of the image or alphanumeric character. This may appear as a drop of ink that is displaced from its intended position. Sometimes two drops will be formed equally spaced from the intended target position. In other instances, numerous small satellite drops are produced. On some occasions the drop may even reach its intended position but at a lower drop volume, producing a lower optical density image. Ultimately the plugged nozzle will fail to fire and no image will be generated.

Therefore, a critical property for an ink jet ink is the "decap time," which is the length of time over which an ink remains fluid in a nozzle opening when exposed to air and therefore capable of firing a drop of ink at its intended target. "Decap" means the nozzle is uncovered or "decapped." A typical "decap" test is run by firing all nozzles successively 100 times at several programmed incremental increasing time intervals. Each ink is given a time score for the first, fifth and thirty-second drop firing. This time interval is the longest interval that the nozzle fires a specified drop without drop displacement or loss of density. The longer the time rating, the more desirable the ink.

A commonly used scheme to cure pluggage is to clear the plug by firing the nozzle in a non-image mode, i.e., into a collection receptacle. While this solution is the most effective remedy, it requires that the ink form a "soft" or noncohesive plug. To make this non-image pluggage clearance effective, the surface plug must be mechanically or cohesively weak.

The ability of a plug to be removable by non-image firing is measured by the fifth and thirty-second drop decap time values. It is highly desirable to obtain a long time interval for the fifth drop because this means the plug is easily removed with only four non-image firings. An ink with long decap values for both the fifth and thirty-second drop indicates that a soft plug forms and is readily cleared.

Another important requirement for ink jet inks where the colorant is a pigment is that the pigment dispersion remains stable throughout the life of the ink jet cartridge. Some cosolvents that inhibit plug formation or promote only soft plugs generally cause destabilization of pigment dispersions and therefore cannot be used in pigmented inks.

U.S. Pat. No. 5,205,861, to Matrick, teaches an ink jet ink comprising an aqueous carrier medium, a colorant, and a nitrogen heterocyclic diol cosolvent. If the colorant is a pigment, the reference teaches that the pigment is contained in a polymeric dispersant. It is believed that these pigment-containing inks are in use in the HP 1200C ink jet printer. The reference does not teach an ink composition containing low molecular weight polyethylene glycols and/or sulfolane.

The print zone of a "heat and delay" printer, such as the HP 1200C, represents an extreme challenge for thermal ink jet devices. The front face is bathed in hot, dry air whenever it is uncapped. Use of the nitrogen heterocyclic diol cosolvent allows for good decap times even in a "heat and delay" printer. However, when the ink is force dried on a glass slide, the wet edge contracts towards the center, leaving rings of dried ink and a highly fluid center. The center remains highly fluid for several hours. Therefore, the ink is susceptible to print smudges.

References such as U.S. Pat. No. 5,180,425, to Matrick et al., U.S. Pat. No. 5,356,464, to Hickman et al., and U.S. Pat. No. 5,100,469, to Pontes et al., teach the use of both sulfolane and polyethylene glycols as cosolvents in ink jet ink. However, these references do not teach the selection of low molecular weight polyethylene glycols or its combination with sulfolane to form inks that inhibit the formation of plugs that are hard to remove.

In addition, although U.S. Pat. No. 4,585,484, to Haruta et al., and U.S. Pat. No. 4,627,875, to Kobayashi et al., teach dye-based recording liquids containing both polyethylene glycol and sulfolane, they do not teach pigmented ink jet inks.

A need exists for cosolvents that function as pluggage "softeners" or inhibitors without destabilizing pigment-based inks.

SUMMARY OF THE INVENTION

The cosolvents incorporated in the ink jet inks of the present invention have the ability to inhibit the formation of hard-to-remove nozzle plugs while being compatible with aqueous pigment dispersions. The ink compositions avoid print smudges and are waterfast.

In accordance with this invention, there is provided an aqueous ink jet ink composition comprising a pigment and an aqueous carrier medium comprising sulfolane and a low molecular weight polyethylene glycol. The low molecular weight polyethylene glycol preferably has a number average molecular weight of from about 200 to about 1500.

DETAILED DESCRIPTION OF PREFERRED EMBODIMENTS

The present invention relates to an ink jet ink composition that is particularly suited for use in ink jet printers in general, and thermal ink jet printers in particular. The ink jet ink compositions are pigment-based inks. The pigmented inks comprise an aqueous carrier medium containing sulfolane and a low molecular polyethylene glycol as cosolvents, and a pigment. These inks are stable over long periods, both in storage and in the printer. The inks produce plugs that are easily removed by non-image firing. The inks may be adapted to the requirements of a particular ink jet printer to provide a balance of light stability, smear resistance, viscosity, surface tension, high optical density, and crust resistance.

A major advantage of the particular cosolvents in this invention is their compatibility with pigment dispersions. Another advantage is the resistance of these cosolvents to chemical change, such as resistance to hydrolysis, in an aqueous media. Cosolvents such as formamide and urea, which are known to have good pluggage performance and are typically used in the prior art, are hydrolytically unstable. In addition, prints made with the cosolvents of the present invention do not smudge and are more waterfast. The aqueous carrier medium of the present invention also allows for higher pigment loading. For example, about 4% to about 8% by weight carbon black can be loaded into the aqueous carrier medium to form the ink.

The aqueous carrier medium contains water. In particular, deionized water is commonly used. In addition, the aqueous carrier medium contains sulfolane and a low molecular weight polyethylene glycol.

As used herein, "a low molecular weight polyethylene glycol" refers to polyethylene glycols having a number average molecular weight between about 200 and about 1,500. Preferably, the low molecular weight polyethylene glycol has a number average molecular weight between about 200 and about 800. More preferably, the polyethylene glycol has a number average molecular weight between about 350 and about 650. In an even more preferred embodiment, the polyethylene glycol has a number average molecular weight between about 350 and about 450. In the most preferred embodiment, the polyethylene glycol has a number average molecular weight of about 400.

Preferably the ink contains from about 1% to about 15% by weight low molecular weight polyethylene glycol. More preferably, the ink contains about 1% to about 10% by weight low molecular weight polyethylene glycol. Even more preferably, the ink contains about 5% by weight low molecular weight polyethylene glycol.

The ink may contain from about 5% to about 40% by weight sulfolane. Preferably, the ink contains from about 10% to about 30% by weight sulfolane, more preferably from about 15% to about 25% by weight sulfolane, and most preferably about 20% by weight sulfolane.

In a preferred embodiment, the ink contains about 20% sulfolane and about 5% polyethylene glycol having a number average molecular weight of about 400.

In the above discussion, percentages are based on the total weight of the ink, including the pigment and the sulfolane and low molecular polyethylene glycol cosolvents.

In addition, the medium may contain additional water miscible organic cosolvents. Selection of a suitable solvent depends on requirements of the specific application, such as desired surface tension and viscosity, selected pigment, drying time of the pigmented ink jet ink, and the type of paper onto which the ink will be printed. Suitable water miscible organic cosolvents include, but are not limited to, ethylene glycol, propylene glycol, diethylene glycols, glycerine, dipropylene glycols, polypropylene glycols, amides, ethers, carboxylic acids, esters, alcohols, organosulfides, organosulfoxides, alcohol derivatives, carbitol, butyl carbitol, cellusolve, ether derivatives, amino alcohols, ketones, N-methylpyrrolidinone, 2-pyrrolidone, cyclohexylpyrrolidone, hydroxyethers, amides, sulfoxides such as dimethyl sulfoxide, lactones, mixtures thereof and the like.

When an additional cosolvent is used, the ratio of water to the cosolvent may be in any effective range. Typically the ratio of water to the additional cosolvent is from about 100:0 to about 30:70, preferably from about 97:3 to about 60:40, although the ratio can be outside these ranges. The cosolvent, when present, generally serves as a humectant, which typically has a boiling point higher than that of water.

A wide variety of organic and inorganic pigments, alone or in combination, may be selected for use in the ink compositions of this invention. The term "pigment" as used herein means a water-insoluble colorant (and thus includes the so-called pigment dyes). The pigment particles should be sufficiently small to permit free flow of the ink through the ink jet printing device, especially at the ejecting nozzles that usually have a diameter ranging from 10 microns to 50 microns. The pigment particle size also has an influence on the pigment dispersion stability, which is critical throughout the life of the ink. It is also desirable to use small particles for maximum color strength.

Accordingly, in embodiments, the particle size may be from about 0.005 microns to about 15 microns. Preferably, the pigment particle size should range from about 0.005 to about 5 microns, more preferably from about 0.005 to about 1 micron, and most preferably from about 0.005 to about 0.3 micron. Pigment particle sizes outside these ranges may, of course, be used so long as the objectives of the present inventions are achieved.

Generally, the ink contains about 1% to about 8% by weight pigment. Preferably, the ink contains about 4% to about 8% pigment. More preferably, the ink contains from about 5% to about 7% pigment. Higher pigment loading enables the production of prints having high optical density.

Preferably, in embodiments, the pigment is carbon black. More preferably, the pigment is Levanyl A-SF, a carbon black dispersion containing water, carbon black, 2-naphthalenesulfonic acid-formaldehyde polymer, sodium salt, available from Miles, Inc. Examples of other carbon black dispersion that can be used in the present invention include but are not limited to Hostafine T and Hostafine TS, available from Hoechst Celanese; CDI 14615, available from CDI Dispersion Co.; Sunsperse LCD 4100, and Sunsperse LHD 9303, available from Sun Chemical Corp.; and Raven 5250, available from Columbian Chemical Co.

Color pigments may also be used in embodiments of the present invention. Examples of color pigments include but are not limited to Hostafine Yellow GR, Hostafine Blue B2G, and Hostafine Rubine FSB, available from Hoeschst Celanese, and Sunsperse Diarylide Yellow YGD 8850, Sunsperse Blue BGD 9346, and Sunsperse Quindo Magenta QHD 6040, available from Sun Chemical Co.

The pigment may be, but need not be, in a dispersion. To disperse the pigment, a polymeric dispersant may be used. Polymeric dispersants suitable for practicing the invention include, but are not limited to, AB or BAB block copolymers wherein the A block is hydrophobic and serves to link with the pigment, and the B block is hydrophilic and serves to disperse the pigment in the aqueous medium. Selection of the polymer for a specific application will depend on the selected pigment and aqueous medium and will be apparent to one skilled in the art. The polymer also may be a polymer as described in U.S. Pat. No. 5,205,861, which is incorporated herein by reference. In a preferred embodiment, the dispersant is Lomar D, available from Rohm & Haas Co.

Block copolymers that are useful as polymeric dispersants in the present invention generally have a number average molecular weight below about 20,000, preferably below about 15,000, and typically in a range of from about 1000 to about 3000. Preferred block copolymers have number average molecular weights in the range of from about 500 to about 1500 for each A and B block.

In addition to or in place of a polymeric dispersant, surfactant compounds may be used as dispersants. The surfactant compounds may also serve to alter surface tension as well as to promote penetration of the ink into the print medium. They may be anionic, cationic, nonionic or amphoteric dispersants, as necessary. A detailed list of non-polymeric as well as some polymeric dispersants appears in, for example, McCutcheon's Functional Materials, North American Edition, Manufacturing Confection Publishing Co., Glen Rock, N.J., pp. 110–129 (1990), the disclosure of which is incorporated herein by reference.

Although random copolymers can also be used as dispersants in embodiments of the invention, they are not as effective in stabilizing pigment dispersions. Among these may be mentioned half-esters of maleic acid/styrene copolymers, lignin sulfonate derivatives, copolymers of acrylic and methacrylic acid with styrene and the like.

The ink may contain other ingredients in appropriate amounts for their respective functions.

For example, humectants may be added to the inks of the present invention. Suitable humectants include, but are not limited to, glycols, N-methyl-pyrrolidone, 2-pyrrolidone, N-methyl-2-pyrrolidone, 1,2,-dimethyl- 2-imidazolidinone, mixtures thereof and the like. Humectants may be included in the ink to prevent water evaporation and sedimentation. Additionally, certain humectants such as N-methyl-pyrrolidone and 2-pyrrolidone have been found to improve solubility in the ink and thus serve the dual role as humectant and cosolvent. In addition, some humectants such as 2-pyrrolidone have been found to resist ink build-up on jet faces during extended printing, which is preferred for cartridge refillability.

When incorporated into the inks of the present invention, approximately 1 to 10 percent of one or more humectants by weight may be added to the ink to prevent sediment build-up on print heads.

Other components may also be incorporated into the inks of the present invention. For example, inks of the present invention may include such additives as biocides, buffering agents, anti-mold agents, pH adjustment agents, electric conductivity adjustment agents, chelating agents, anti-rusting agents, and the like. Such additives may be included in the ink jet inks of the present invention in any effective amount, as desired. For example, such additives may be included in an amount ranging from about 0.0001 to about 4.0 percent by weight, and preferably from about 0.01 to about 2.0 percent by weight of the ink. More preferably, such additives may be included in an amount ranging from about 0.01 to about 0.5 percent by weight of the ink and most preferably from about 0.05 to about 0.3 percent by weight. The amount included will depend, of course, on the specific component being included.

Examples of buffering agents include, but are not limited to, agents such as sodium borate, sodium hydrogen phosphate, sodium dihydrogen phosphate, mixtures thereof and the like. Examples of biocides include, but are not limited to, Dowicil™ 150, 200, and 75; benzoate salts; sorbate salts; mixtures thereof and the like.

Additional pH controlling agents may also be included in the ink, if desired. Examples of such pH controlling agents suitable for inks of the present invention include, but are not limited to, acids; bases, including hydroxides of alkali metals such as lithium hydroxide, sodium hydroxide and potassium hydroxide; phosphate salts; carbonate salts; carboxylate salts; sulfite salts; amine salts; amines such as diethanolamine and triethanolamine; mixtures thereof and the like. When present, the pH controlling agent is preferably included in an amount of up to about 1 percent by weight, and preferably from about 0.01 to about 1 percent by weight.

Other additives may also be added. For example, trimethylol propane may be added to the ink jet ink compositions, for example, to reduce paper curl or as an anti-cockle agent.

Other suitable additives are disclosed, for example, in U.S. Pat. No. 4,737,190 to Shimada et al., the entire disclosure of which is incorporated herein by reference.

In forming the final ink jet ink compositions of the present invention, certain physical properties should be satisfied. For example, ink compositions for use in ink jet recording processes should have appropriate viscosity and surface tension characteristics. In the present invention, it is preferred that the ink jet ink composition has a viscosity of from about 0.7 to about 15 cP at 25° C. More preferably, the viscosity is from about 1 to about 10 cP, and even more preferably from about 1 to about 5 cP. It is also preferred that the ink jet ink composition has a surface tension of from about 20 to about 70 dynes/cm at 25° C. More preferably, the surface tension is from about 25 to about 60 dynes/cm, and even more preferably from about 40 to about 60 dynes/cm.

In embodiments, the inks are prepared by mixing the components of the aqueous carrier medium. The aqueous carrier medium is then slowly added to the pigment dispersion with continuous mixing to prevent shocking. The ink is then processed by methods known to one of ordinary skill in the art. Processing techniques include but are not limited to sonication, attrition, high shear milling, and microfluidization. One of ordinary skill in the art can readily determine the processing techniques based on the batch size and the components of the ink. The processed ink is preferably then filtered using, for example, a 1.2 micron filter.

The inks of the present invention are further defined by reference to the following illustrative examples, it being understood that the invention is not limited to the materials, conditions, process parameters, etc. recited herein. All parts and percentages are by weight unless otherwise indicated.

EXAMPLES

EXAMPLE 1

An ink is formed having the following components:

20 weight % sulfolane;

4 weight % Levanyl A-SF carbon black dispersion;

5 weight % polyethylene glycol 400; and 0.1 weight % Dowicil 200 in deionized water. All of the components except the pigment dispersion are premixed. The mixture is then slowly added to the dispersion with continuous mixing. The ink is then processed by sonication. The processed ink is then filtered through a 1.2 micron filter.

The ink, when spotted on a glass microscope slide remains a uniform fluid for at least several days and does not form a film, crust or crystals. The ink is jetted from a Hewlett Packard ("HP") 1200C printer having 300 spi resolution using a HP 1200C ink cartridge that has been drained, rinsed, refilled and resealed. The prints are uniform and dark with no streaking or edge defects due to undersized or missing drops. Solid area optical density of the prints formed is slightly superior to that of prints formed by the HP 1200C ink.

EXAMPLE 2

An ink is prepared and tested according to the procedures of Example 1 except using:

10 weight % 1,3-dimethyl-2-imidazolidone;
4 weight % Hostafine TS;
5 weight % polyethylene glycol 600; and
0.1 weight % Dowicil 200;

in deionized water. The ink, when spotted on a glass microscope slide remained fluid for 18 hours before forming a slight film on its surface. The prints are good and there were only a few defects due to undersized drop and no defects due to missing drops.

COMPARATIVE EXAMPLE 1

An ink is prepared and tested according to Example 2 except that the 5 weight % polyethylene glycol 600 is replaced with polyethylene glycol 3350. The ink, when spotted on a glass microscope slide, dried to an amorphous, crusty solid within 18 hours.

What is claimed is:

1. An ink jet ink comprising an aqueous carrier medium and a pigment, said aqueous carrier medium comprising sulfolane and a low molecular weight polyethylene glycol, wherein said low molecular weight polyethylene glycol has a number average molecular weight between 200 and 800.

2. The ink of claim 1, wherein said low molecular weight polyethylene glycol has a number average molecular weight between 350 and 650.

3. The ink of claim 1, wherein said low molecular weight polyethylene glycol has a number average molecular weight between 350 and 450.

4. The ink of claim 1, wherein said low molecular weight polyethylene glycol has a number average molecular weight of about 400.

5. The ink of claim 1, wherein said aqueous carrier medium contains 1–15 weight % of said low molecular weight polyethylene glycol based on the total weight of the ink.

6. The ink of claim 1, wherein said aqueous carrier medium contains about 5 weight % of said low molecular weight polyethylene glycol based on the total weight of the ink.

7. The ink of claim 1, wherein said aqueous carrier medium contains 5–40 weight % sulfolane based on the total weight of the ink.

8. The ink of claim 1, wherein said aqueous carrier medium contains 10–30 weight % sulfolane based on the total weight of the ink.

9. The ink of claim 1, wherein said aqueous carrier medium contains 15–25 weight % sulfolane based on the total weight of the ink.

10. The ink of claim 1, wherein said aqueous carrier medium contains about 20 weight % sulfolane based on the total weight of the ink.

11. The ink of claim 1, wherein said aqueous carrier medium contains 1–15 weight % of said low molecular weight polyethylene glycol and 5–40 weight % sulfolane based on the total weight of the ink.

12. The ink of claim 1, wherein said ink comprises about 20 weight % sulfolane and about 5 weight % polyethylene glycol having a number average molecular weight of about 400.

13. The ink of claim 1, wherein said ink contains 1% to 8% by weight of said pigment.

14. The ink of claim 1, wherein said ink contains 4% to 8% by weight of said pigment.

15. The ink of claim 1, wherein the pigment is in a pigment dispersion comprising a dispersant.

16. The ink of claim 1, wherein said pigment is carbon black.

17. The ink of claim 16, wherein said ink contains 4% to 8% carbon black by weight.

18. The ink of claim 1, wherein said ink is free of a polymeric dispersant.

19. An ink jet ink comprising an aqueous carrier medium and a pigment, said aqueous carrier medium consisting essentially of water, sulfolane and a low molecular weight polyethylene glycol, wherein said low molecular weight polyethylene glycol has a number average molecular weight between 200 and 800.

* * * * *